United States Patent [19]

Kanamaru

[11] Patent Number: 4,855,978
[45] Date of Patent: Aug. 8, 1989

[54] VIDEO/COMPACT DISK PLAYER HAVING REDUCED TRACK SEARCH TIME

[75] Inventor: Hitoshi Kanamaru, Saitama, Japan

[73] Assignee: Pioneer Electronic Corporation, Tokyo, Japan

[21] Appl. No.: 129,391

[22] Filed: Nov. 24, 1987

Related U.S. Application Data

[63] Continuation of Ser. No. 802,398, Nov. 7, 1985, abandoned.

[30] Foreign Application Priority Data

Nov. 28, 1984 [JP] Japan ................... 59-251383

[51] Int. Cl.$^4$ ................... G11B 21/08; G11B 19/24
[52] U.S. Cl. ................... 369/32; 364/33;
  364/43; 364/50; 364/267; 360/73.03; 360/78.04
[58] Field of Search ................... 369/32, 33, 41, 43–47,
  369/50, 59, 267, 30; 360/72.1, 72.2, 73.03,
  77.02, 78.04, 78.05, 78.06, 78.07, 78.11

[56] References Cited

U.S. PATENT DOCUMENTS

| | | | |
|---|---|---|---|
| 4,223,349 | 9/1980 | Dakin et al. | 369/50 |
| 4,228,326 | 10/1980 | Dakin et al. | 369/33 |
| 4,390,977 | 6/1983 | Onigata et al. | 369/50 |
| 4,492,992 | 1/1985 | Rooney et al. | 360/73 |
| 4,641,294 | 2/1987 | Yoshimaru | 369/32 |

FOREIGN PATENT DOCUMENTS

| | | | |
|---|---|---|---|
| 0123946 | 11/1984 | European Pat. Off. | 369/50 |
| 57-46355 | 3/1982 | Japan | 369/50 |
| 58-23365 | 2/1983 | Japan | 360/72.2 |

*Primary Examiner*—Alan Faber
*Assistant Examiner*—Steven R. Garland
*Attorney, Agent, or Firm*—Sughrue, Mion, Zinn, Macpeak & Seas

[57] ABSTRACT

A player system for a video disk or a compact audio disk in which the time to move the pickup to the start of a playing position of a selection other than at the beginning of the disk is considerably reduced. The pickup is first moved to a position substantially at the middle of the area containing recorded information on the disk in a single quick motion. Then a search operation is begun for the address of the desired selection. The speed of the disk is also controlled so that when the pickup reaches the middle of the disk playback can begin immediately.

10 Claims, 4 Drawing Sheets

VIDEO/COMPACT DISK PLAYER HAVING REDUCED TRACK SEARCH TIME

This is a continuation of application Ser. No. 802,398, filed Nov. 27, 1985 now abandoned.

BACKGROUND OF THE INVENTION

The present invention relates to a player for video or compact disks. More specifically, the invention relates to such a player having an improved function of starting the playing of a disk, particularly, a CLV (Constant Linear Velocity) type disk played at a nonconstant angular velocity, at other than its ordinary beginning position.

It is often desired to start the play of a disk at other than its ordinary beginning position, for instance, to start the play of an audio disk at a particular musical selection. In the conventional player, it is necessary to first start the play of the disk from its ordinary beginning position, then perform a search operation to locate the start position of the desired selection. More specifically, the disk is first set on the turntable and the PLAY button or the like is depressed, whereupon the disk starts rotating. The pickup (playback head) is then moved from its rest (parked) position slightly outside of one of the inner and outer edges of the area where data is recorded on the disk to the start position on the disk where control codes and the like are recorded prior to the start of the other recorded data. The focus and tracking servo systems are then actuated. Next, a control code is read from the start position of the disk to determine whether the disk is recorded in the CLV mode of the CAV (Constant Angular Velocity) mode. Subsequently, the start address of the desired selection is searched for. When this start address is reached, play of the disk is commenced in the specified mode.

The desired playback start position is specified in the form of chapter, frame and time numbers. A microprocessor contained in the control unit for the player instructs the carrying out of the search operation using this data. In doing so, the pickup is moved in the radial direction of the disk from the innermost or outermost edge of the area where information is recorded to the indicated start position, reading out chapter numbers as it is moving. Upon arriving at the specified start position, the spindle servo (which controls the rotational speed of the disk) is locked and the disk is rotated at the appropriate speed for the location of the pickup.

In this operation, start and then search movements must be performed sequentially. As a result, much time passes before the playing of the desired selection can begin. In a player in which the parked position of the pickup is at the inner periphery of the disk, as much as 30 seconds may pass before a desired selection can be played, about 15 seconds for the start operations and about another 15 seconds for the search operation in the case of a 30 cm CLV disk.

It is of course possible to reduce these times by merely providing a motor having a higher torque output, and accordingly employing more sturdy associated components used in rotating the disk and moving the pickup. Doing so, however, is unavoidably costly. Moreover, there is a limit as to how much the starting time can be reduced due to difficulties in reading address information from the disk as its speed is increased.

SUMMARY OF THE INVENTION

Accordingly, it is an object of the present invention to provide a player for a compact disk or a video disk in which the above-mentioned drawbacks have been eliminated.

In accordance with the above and other objects, the invention provides a disk player system comprising pickup means for reading information recorded on a disk being played; means for moving the pickup means radially of the disk; and means for instructing the pickup moving means to move the pickup means to a start position intermediate of innermost and outermost edges of an area on the disk containing recorded information before commencing a search operation to move the pickup means to a start position of a designated program recorded on the disk; and means for rotating the disk when the pickup means is at the start position at a speed proper for reading information from the disk by the pickup means at the start position.

The start position is preferably substantially at a middle position, in the radial direction of the disk, of the area containing recorded information. The instructing means may comprise means for supplying an instructing voltage to the pickup moving means for moving the pickup means in response to the voltage.

The start position may be set to correspond to a playback start position. Further, the instructing means may comprise means for supplying an instructing digital signal to the pickup moving means for moving the pickup means to the start position, and the instructing means may comprise a digital-to-analog converter. The rotating means may include means for establishing a speed of rotation of the disk in response to the digital signal. Also, the rotating means may set the speed of rotation of the disk in response to an output of the digital-to-analog converter.

The inventive disk player system may further comprise means for detecting a radial position of the pickup means relative to the disk, and the rotating means may establish the speed of rotation of the disk in response to an output of the detecting means representative of the radial position. The invention is especially advantageous for use with a CLV type disk.

DESCRIPTION OF THE PREFERRED EMBODIMENTS

Figure 1:
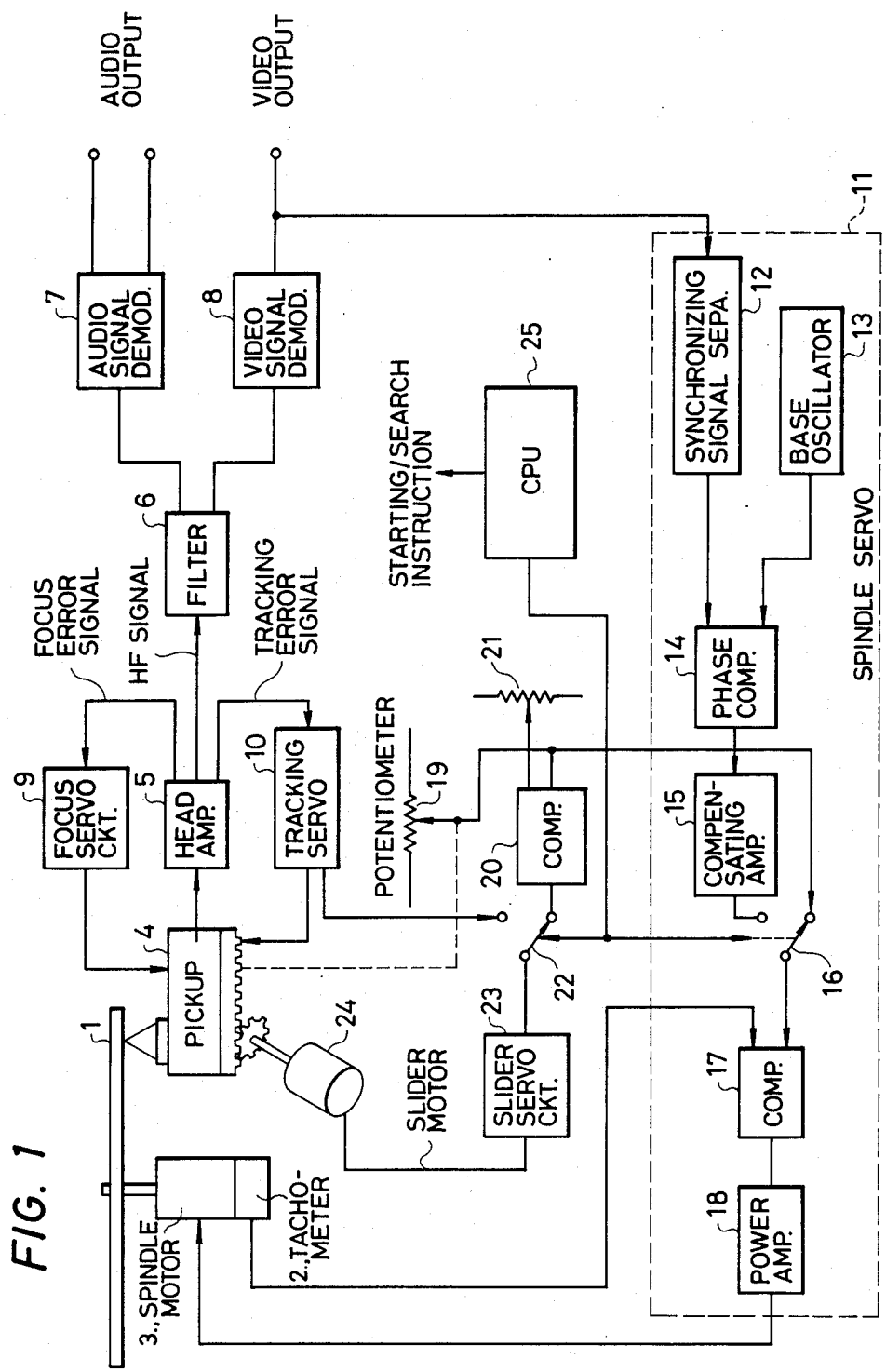
FIG. 1 is a block diagram of a video disk player constructed in accordance with the present invention.

In FIG. 1 is shown a block diagram of a video disk player constructed in accordance with a first preferred embodiments of the invention.

In the player of FIG. 1, a disk 1 is rotated by a spindle motor 3 having associated therewith a tachometer which detects the speed of rotation of the motor 3. A pickup 4 reads the data recorded on the disk 1 as it rotates using a laser beam or the like reflected from the tracks on the surface of the disk 1. The output reproduced signal from the pickup 1 is amplified by a head amplifier 5, and the resulting RF or HF signal is supplied to a filter 6 which divides the signal into video and audio signal components, which in turn are supplied to an audio signal demodulator 7 and a video signal demodulator, respectively. A focus error signal also produced by the head amplifier 5 is supplied to a focus servo circuit 9 with which the focusing of the reading beam of the pickup is controlled. Further, a tracking error signal produced by the head amplifier 5 is supplied to a tracking servo circuit 10 with which the position of the reading spot of the pickup 4 relative to the tracks on the disk 1 is controlled.

A synchronizing signal separator 12 in a spindle servo circuit 11 is provided to separate color burst and horizontal synchronizing signals from the output of the video signal demodulator 8, and the separated signals are applied to a phase comparator 14 along with a reference signal, having a fixed frequency and phase, from a reference oscillator 13. The output of the phase comparator 14 is compensated and amplified by a compensating amplifier 15 before being supplied to a comparator 17 through a switch 16. The output of the tachometer 2 is supplied to the other input of the comparator 17, whose output is used to drive the spindle motor 3 through an amplifier 18.

The control shaft of a potentiometer 19 is interlocked with the movement of the pickup 4, that is, the position of the resistance setting of the potentiometer 19 is varied in accordance with the radial position of the pickup 4 relative to the disk 1. Accordingly, a voltage signal is produced at the wiper contact of the potentiometer 19 representative of the radial position of the pickup 4 relative to the disk 1. This output of the potentiometer 19 is supplied to the comparator 17 through a comparator 20 and the switch 16.

A variable resistor 21, used to set the start position of the pickup 4, provides a reference voltage to the comparator 20. This reference voltage may be a value which causes the pickup 4 to be positioned at other than the areas surrounding the innermost and outermost edges of the recorded area on the disk 1. For example, the variable resistor 21 can be set so as to cause the pickup 4 to be positioned approximately at the middle of the recorded area on the disk 1. The output of the comparator is supplied to a slider servo circuit 23 through a switch 22 and is used to drive a slider motor 24 which moves the pickup 4 in the radial direction of the disk 1. A CPU (Central Processing Unit) 25, such as a microprocessor, is used to control the switches 16 and 22, as well as various other circuit elements.

The operation of the disk player thus constructed will now be described.

Figure 2:
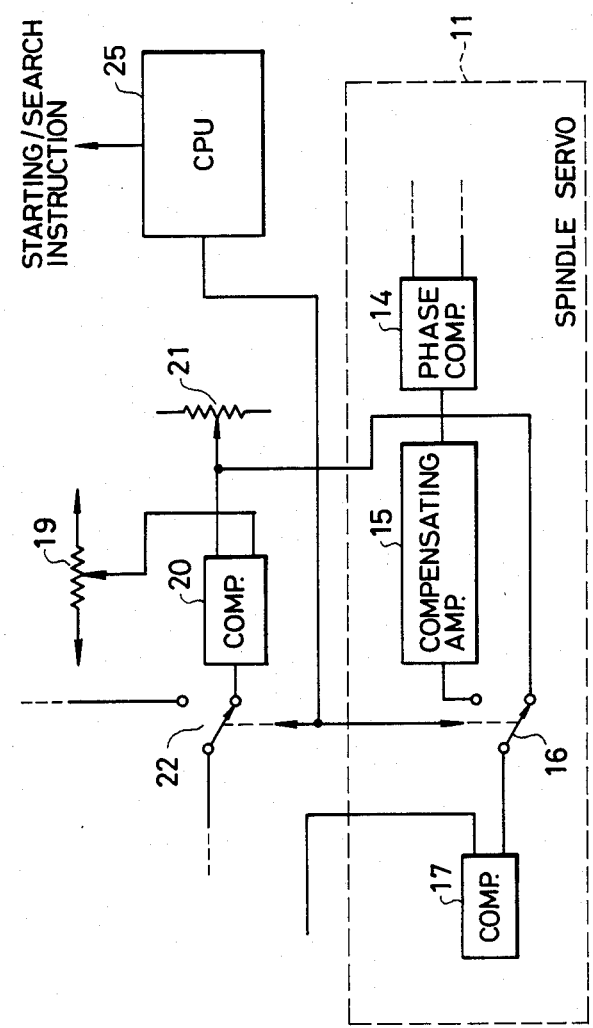
FIGS. 2 to 4 are block diagrams of video disk players of other embodiments of the invention.

When the operator specifies an input search address (including time, chapter, frame number, etc.) and presses the PLAY button, the CPU 25 will issue starting instructions to the various controlled circuit elements, specifically, setting the switches 16 and 22 to their downward positions shown in FIGS. 1 and 2. The variable resistor 21 is assumed to be set so as to cause the pickup 4 to be moved to a start position near the middle of the recorded information on the disk 1.

Assuming the pickup's rest position is at the innermost periphery of the disk 1, the difference signal supplied to the comparator 20, applied to the slider servo circuit 23 through the switch 22, causes the slider motor 24 to move the pickup 4 in the radial direction of the disk 1 until the difference signal outputted from the comparator 20 becomes zero, at which point the pickup 4 will be located substantially at the middle of the recorded area of the disk 1. On the other hand, the output of the potentiometer 19 is supplied to one input of the comparator 17 through the switch 16 and the output of the tachometer 2 to the other input of the comparator 17. Because the disk is not rotated substantially during this initial period, the output from the tachometer 4 is at a low level. Accordingly, the output from the comparator 17 is high, and hence the disk is rotated while the pickup 4 is transported to the starting position at the middle of the recorded area on the disk 1, being driven by the output of the power amplifier 18 in response to this high output from the comparator 17.

The rotational speed of the CLV disk 1 is smaller when the pickup 4 is near its outer periphery than when the pickup 4 is near its inner periphery. Consequently, the number of revolutions of the disk 1 until the pickup 4 reaches a starting position on the outer periphery of the recorded area on the disk 1 is significantly less than when the pickup 4 is moved to a starting position on the inner periphery of the recorded area.

When the starting sequence has been completed, the CPU 25 sets the switches 16 and 22 to their upward positions shown in FIGS. 1 and 2, whereupon a normal servo lock-in operation is performed. Specifically, the slider servo follows the tracking servo because the tracking servo circuit supplies the DC component of the tracking error signal to the slider servo circuit 23 through the switch 22. Since the spindle servo circuit 11 operates to make the frequency and phase of the output signal of the tachometer 2 follow the color subcarrier signal separated out by the synchronizing signal separator 12, the disk 1 is rotated at the normal speed, whereupon audio and video outputs are provided by the respective audio and video signal demodulator 7 and 8. At this time, address data, etc., indicative of the present position of the pickup 4 is obtainable.

The CPU then begins the search sequence. Specifically, because the pickup 4 is located substantially at the middle of the recorded area on the disk 1, which location is other than the expected normal starting point of the playing operation, it is necessary for the CPU to compute the difference between the specified and present positions and move the pickup 4 toward the specified position in accordance with the calculated difference. In the worst case, because the distance covered by the pickup 4 is only about half the track zone of the disk 1, the time required for searching purposes will be much shorter than in a conventional player on the average.

FIG. 2 shows a second embodiment of the invention, wherein like reference numbers designate like elements in FIG. 1.

In this embodiment, the output of the variable resistor 21, rather than the output of the potentiometer 19, is used as the reference signal for the comparator 17 in the starting sequence.

Figure 3:
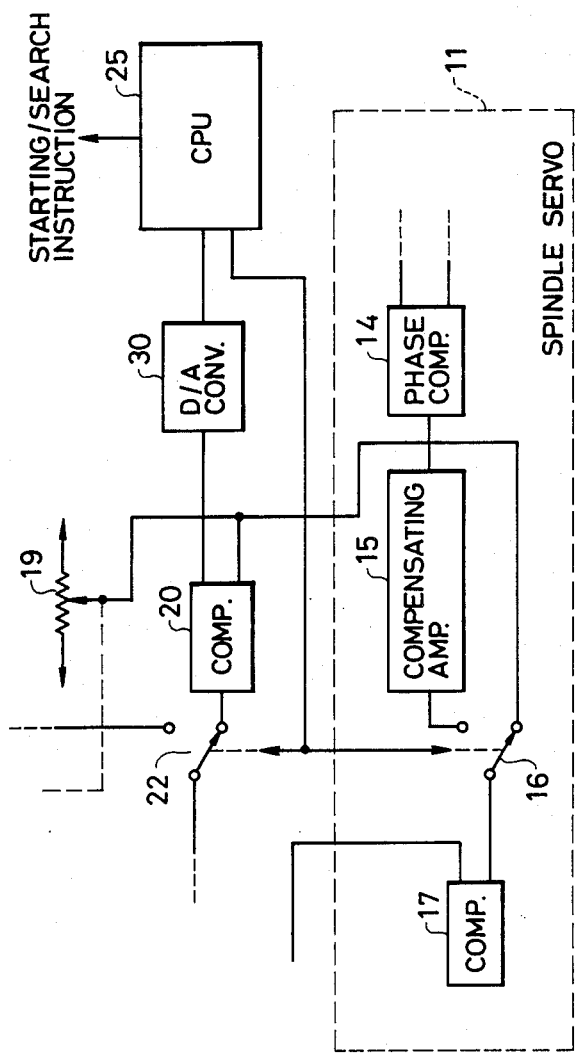
Figure 4:
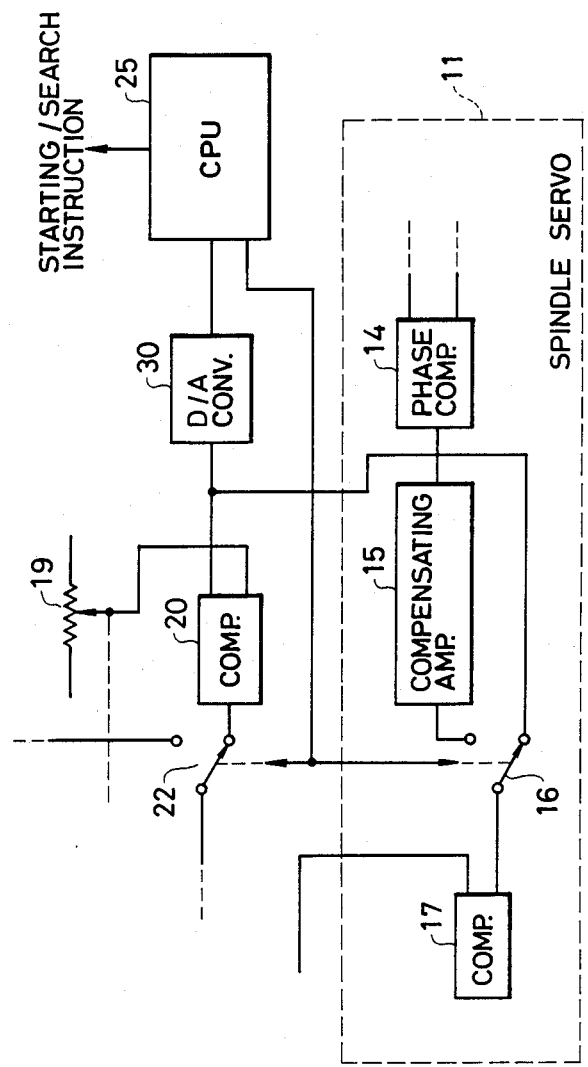

In embodiments shown in FIGS. 3 and 4, a digital output of the CPU 25, instead of the output of the variable resistor 21, is applied as the reference signal to the comparator 17, supplied through a digital-to-analog converter 30. Otherwise, the arrangements of FIGS. 3 and 4 are similar to those of FIGS. 1 and 2. In the embodiments of FIGS. 3 and 4, unlike the cases of the first two embodiments, the starting point of the pickup can be changed by the operator by entering a new starting point via the CPU 25 as control program data. Such an arrangement is particularly advantageous when the desired starting point on the disk 1 is known in advance. The correlation between the frame and time number to the corresponding reading position on the disk can be expressed in the form of a mathematical formula, which formula can be stored in advance in the program memory of the CPU 25 and used to compute the proper starting point of the pickup 4. Also, by performing the required comparisons digitally in the CPU, the digital-to-analog converter can be eliminated.

Although the invention has been described with reference to the case of an optical video disk player, it can be applied as well to players for disks, etc., recorded using other recording systems, including electro-capacitive, magnetic, and opto-magnetic systems.

As set forth hereinabove, the invention provides a disk player system in which the pickup is initially quickly transported to a start position substantially at the middle of the recorded area on the disk, that is, to a start position other than near the innermost or outermost edges of the recorded area. Accordingly, the number of revolutions of the disk needed before the pickup reaches the designated playing position is substantially reduced on the average.

This completes the description of the preferred embodiments of the invention. Although preferred embodiments have been described, it is believed that numerous modifications and alternation thereto would be apparent to one of ordinary skill in the art without departing from the spirit and scope of the invention.

I claim:

1. A disk player system comprising:
   pickup means for reading information recorded on a disk being played;
   means for moving said pickup means radially of said disk;
   first controlling means for controlling a radial position of said pickup means during a normal playing operation;
   first instructing means for instructing said pickup moving means to move said pickup means to a program-start position of a designated program recorded on said disk so as to commence a playback operation at said program-start position;
   motor means for rotating said disk;
   second controlling means for controlling said motor means to rotate at an appropriate speed during said normal playing operation;
   second instructing means for instructing said motor means to start rotating said disk when said pickup means is being moved to said program-start position so that, when said pickup means arrives at said program-start position, said disk will be rotating at a speed proper for reading information from said disk by said pickup means at said program-start position;
   first switch means for selectively connecting said pickup moving means to said first controlling means or said first instructing means;
   second switch means for selectively connecting said motor means to said second controlling means or said second instructing means;
   and start instructing means for simultaneously controlling both said first and second switches to simultaneously connect said pickup moving means to said first instructing means and said motor means to said second instructing means to start a play operation, then simultaneously connecting said pickup moving means to said first controlling means and said motor means to said second controlling means to allow said normal playing operation.

2. The disk player system of claim 1, wherein said program-start position is substantially at a middle position, in a radial direction of said disk, of an area containing recorded information.

3. The disk player system of claim 2, wherein said first instructing means comprises means for supplying an instructing voltage to said pickup moving means for moving said pickup means to said program-start position.

4. The disk player system of claim 3, wherein said second instructing means comprises means for setting a speed of rotation of said disk in response to said voltage.

5. The disk player system of claim 1, wherein said first instructing means comprises means for supplying an instructing digital signal to said pickup moving means for moving said pickup means to said program-start position.

6. The disk player of claim 5, wherein said pickup moving means comprises a digital-to-analog converter for converting said instructing digital signal to an analog voltage.

7. The disk player system of claim 6, wherein said second instructing means comprises means for setting a speed of rotation of said disk in response to an output of said digital-to-analog converter.

8. The disk player system of claim 5, wherein said second instructing means comprises means for setting a speed of rotation of said disk in response to said digital signal.

9. The disk player system of claim 1, further comprising means for detecting a radial position of said pickup means relative to said disk, and wherein said second instructing means comprises means for establishing a speed of rotation of said disk in response to an output of said detecting means representative of said radial position.

10. The disk player system of claim 1, wherein said disk is a constant linear velocity type disk.

* * * * *